US011950173B2

(12) United States Patent
Wang et al.

(10) Patent No.: US 11,950,173 B2
(45) Date of Patent: Apr. 2, 2024

(54) METHOD OF DETERMINING SHARED SERVICE INDEX BASED ON SHARED SERVICE OF COMMUNICATION CREDENTIAL

(71) Applicant: SHENZHEN UCLOUDLINK NEW TECHNOLOGY CO., LTD., Guangdong (CN)

(72) Inventors: Liang Wang, Guangdong (CN); Enpeng Bai, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 325 days.

(21) Appl. No.: 17/411,365

(22) Filed: Aug. 25, 2021

(65) Prior Publication Data
US 2021/0385634 A1    Dec. 9, 2021

Related U.S. Application Data

(63) Continuation-in-part of application No. PCT/CN2020/102148, filed on Jul. 15, 2020.

(30) Foreign Application Priority Data

Aug. 12, 2019 (CN) .......................... 201910738667.4

(51) Int. Cl.
*H04M 3/42* (2006.01)
*H04W 4/24* (2018.01)
(Continued)

(52) U.S. Cl.
CPC ............... *H04W 4/50* (2018.02); *H04W 4/24* (2013.01); *H04W 8/18* (2013.01); *H04W 12/72* (2021.01); *H04W 28/16* (2013.01); *H04W 48/16* (2013.01)

(58) Field of Classification Search
None
See application file for complete search history.

(56) References Cited

U.S. PATENT DOCUMENTS

2015/0171910 A1    6/2015  Gao
2017/0170856 A1*   6/2017  Shen .................... H04M 15/765
2019/0394667 A1*  12/2019  Shariati ............. H04W 28/0205

FOREIGN PATENT DOCUMENTS

CN    101517961 A  *  8/2009  ............ H04L 12/14
CN    104219615 A     12/2014
(Continued)

OTHER PUBLICATIONS

EESR of EP20853219.2 dated Mar. 25, 2022.

*Primary Examiner* — Yuwen Pan
*Assistant Examiner* — Alexander J Yi
(74) *Attorney, Agent, or Firm* — Robert L. Stearns; Dickinson Wright PLLC

(57) ABSTRACT

The present disclosure is applicable to the technical field of communications, and provides a method of determining a shared service index based on a shared service of communication credential, including: obtaining operating parameters of communication credentials for providing shared communication services in a shared service period; determining shared service indexes for the communication credentials according to the operating parameters; and generating recommendation information of the communication
(Continued)

credentials according to the shared service indexes of all communication credentials. In the embodiments of the present disclosure, the shared service indexes are used to quantify qualities of the shared services of the communication credentials, and the recommendation information is generated according to the shared service indexes, in this way, the recommendation information may intuitively show a difference among the qualities of shared services provided by the communication credentials.

6 Claims, 4 Drawing Sheets

(51) Int. Cl.
*H04W 4/50* (2018.01)
*H04W 8/18* (2009.01)
*H04W 12/72* (2021.01)
*H04W 28/16* (2009.01)
*H04W 48/16* (2009.01)

(56) References Cited

FOREIGN PATENT DOCUMENTS

| | | | | |
|---|---|---|---|---|
| CN | 105228179 A | | 1/2016 | |
| CN | 105282701 A | | 1/2016 | |
| CN | 105491553 A | | 4/2016 | |
| CN | 105682077 A | | 6/2016 | |
| CN | 105979500 A | | 9/2016 | |
| CN | 106779907 A | | 5/2017 | |
| CN | 107659928 A | | 2/2018 | |
| CN | 107682833 A | * | 2/2018 | ............ H04W 24/08 |
| CN | 108600975 A | | 9/2018 | |
| CN | 108990077 A | * | 12/2018 | ............ H04W 24/00 |
| CN | 109413145 A | | 3/2019 | |
| CN | 110602665 A | | 12/2019 | |
| EP | 3367731 A1 | * | 8/2018 | ............ H04W 48/16 |
| EP | 3367731 A1 | | 8/2018 | |
| JP | 4153696 B2 | * | 9/2008 | ............ H04W 8/183 |
| WO | 2017152492 A1 | | 5/2016 | |
| WO | 2017008438 A1 | | 1/2017 | |
| WO | WO-2017008438 A1 | * | 1/2017 | ............ H04W 8/205 |

* cited by examiner

METHOD OF DETERMINING SHARED SERVICE INDEX BASED ON SHARED SERVICE OF COMMUNICATION CREDENTIAL

CROSS-REFERENCE TO RELATED APPLICATION

This application is a continuation-in-part of PCT patent application Serial No. PCT/CN2020/102148, with an international filing date of Jul. 15, 2020, which claims priority to Chinese patent application No. 201910738667.4 filed on Aug. 12, 2019 and entitled "a method of determining shared service index based on shared service of communication credential", the disclosure of which is incorporated herein by reference in entirety.

TECHNICAL FIELD

The present disclosure relates to the technical field of communications, and particularly relates to a method for determining shared service index based on shared service of communication credential, and a device for determining shared service index based on shared service of communication credential.

BACKGROUND

With a rapid development in the technical field of communications, and the increasing requirement of users on mobile communication service, a service platform comes out in recent years, this service platform serves as a transaction platform for providing SIM card resources, a SIM card supplier is allowed to publish SIM (Subscriber Identity Module) card resources, the SIM card resources include network traffic, voice and short messages, so that a user is allowed to select and purchase these SIM card resources, the user and the service platform are allowed to assign a contract, so that the user is allowed to share SIM card resources provided by the SIM card supplier, a cloud service is provided, so that a transfer of the SIM card resource is realized according to the contract.

However, the qualities of shared services for the SIM cards provided by the SIM card supplier are uneven on such service platform, there are many factors that cause bad qualities of shared services, these factors can be such as a human factor such as an interruption of the shared service caused by the SIM card supplier by disconnecting the SIM card that is providing the shared service, an objective factor that an inherent attribute of the SIM card leads to a low quality of shared service, and the like. Thus, the user on such service platform requires a reference during purchase so that he/she can be prevented from purchasing a SIM card shared service with a lower quality of shared service.

BRIEF SUMMARY OF THE INVENTION

On this basis, Embodiments of the present disclosure provide a method for determining shared service index of shared service of communication credential, and a device for determining shared service index of shared service of communication credential, the user is provided with shared service indexes of communication credentials, so that the user is avoided from purchasing a shared service with lower quality during selection and purchase process.

In the first aspect, one embodiment of the present disclosure provides a method of determining shared service index based on shared service of communication credential, which is performed on a system for shared service of communication credential comprising a SIM card supplier, a request terminal of shared service and a server communicated with the SIM card supplier and the request terminal of shared service, including:

obtaining, by the server, operating parameters of communication credentials for providing shared communication services in a shared service period from the SIM card supplier and the request terminal of shared service;

determining, by the server, shared service indexes of the communication credentials according to the operating parameters; and generating, by the server, recommendation information of the communication credentials according to the shared service indexes of all these communication credentials.

In a possible implementation mode of the first aspect, the method further includes:

sending, by the server, the recommendation information to the request terminal when obtaining a shared service request instruction sent by the request terminal of shared service; and/or taking, by the server, a communication credential which has a lowest value and corresponds to the shared service index as a target scheduling credential for the request terminal of shared service when receiving a scheduling instruction sent by the request terminal of shared service, thereby providing the shared communication service for the request terminal of shared service through the target scheduling credential by the server.

In the second aspect, one embodiment of the present disclosure provides a computer device, including:

a memory, a processor, and a computer program stored in the memory and executable by the processor, the processor is configured to execute the computer program to:

obtain operating parameters of communication credentials for providing shared communication services in a shared service period;

determine shared service indexes of the communication credentials according to the operating parameters; and generate recommendation information of the communication credentials according to the shared service indexes of all these communication credentials.

In the third aspect, one embodiment of the present disclosure provides a computer readable storage medium which stores a computer program, the computer program is configured to be executed by a processor so as to cause the processor to:

obtain operating parameters of communication credentials for providing shared communication services in a shared service period;

determine shared service indexes of the communication credentials according to the operating parameters; and generate recommendation information of the communication credentials according to the shared service indexes of all these communication credentials.

It should be understood that, regarding the advantageous effects of the second aspect and the third aspect, reference can be made by the relevant descriptions in the first aspect, the advantageous effects of the second aspect and the third aspect will not be repeatedly described here.

The embodiments of the present disclosure have advantageous effects as compared to the prior art, which are listed as follows:

In the embodiments of the present disclosure, the operating parameters of each of the communication credentials for providing shared communication service within the shared service period are acquired, then, the shared service index is determined according to the acquired operating parameters, so that the qualities of the shared services of the communication credentials are quantified, the recommendation information is generated according to the shared service index, the recommendation information intuitively represents the differences of the qualities of the shared services of the communication credentials, when the user terminal sends an instruction for requesting shared service, more reference options are provided for the user when he/she selects the shared services of the communication credentials, and the user is avoided from selecting a communication credential with lower quality of shared service when he/she can not determine the qualities of the shared services of the communication credentials.

DETAILED DESCRIPTION OF THE DRAWINGS

In order to describe the embodiments of the present disclosure more clearly, a brief introduction regarding the accompanying drawings that need to be used for describing the embodiments of the present disclosure or the prior art is given below; it is apparent that the accompanying drawings described as follows are merely some embodiments of the present disclosure, the person of ordinary skill in the art may also acquire other drawings according to the current drawings without paying creative labor.

Figure 3:
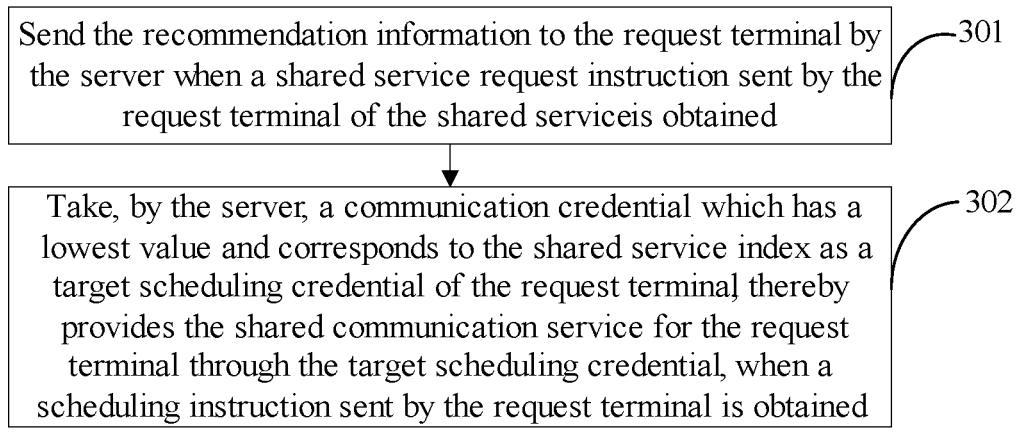
Figure 4:
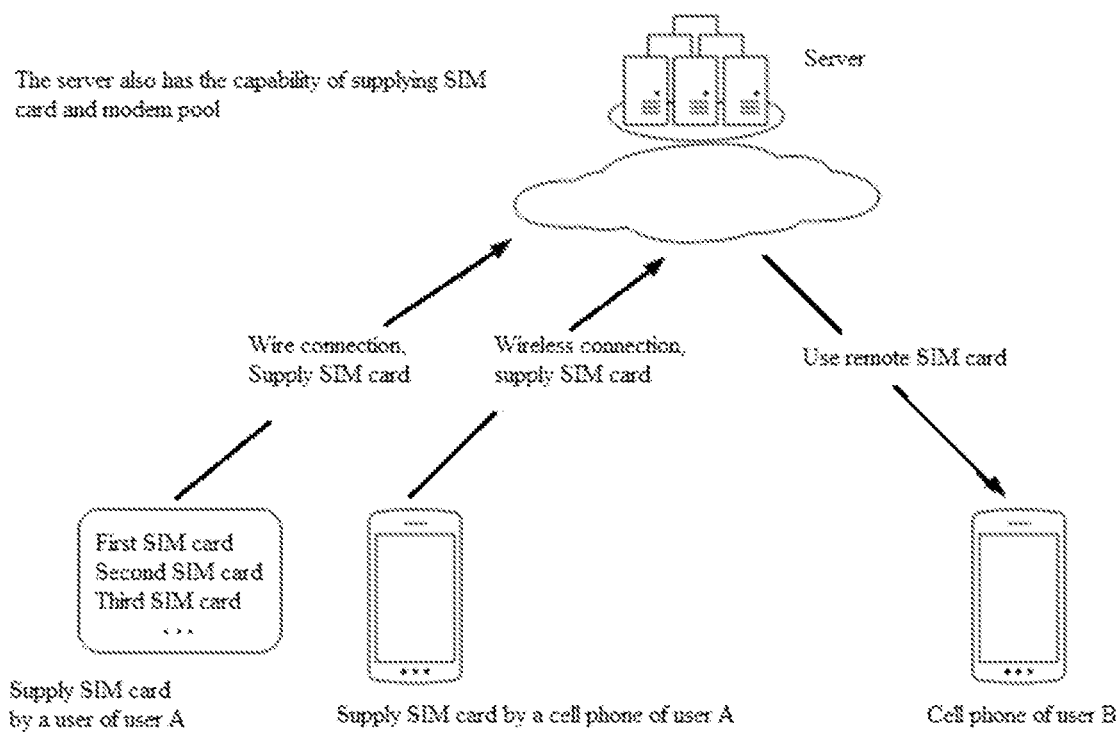
Figure 5:
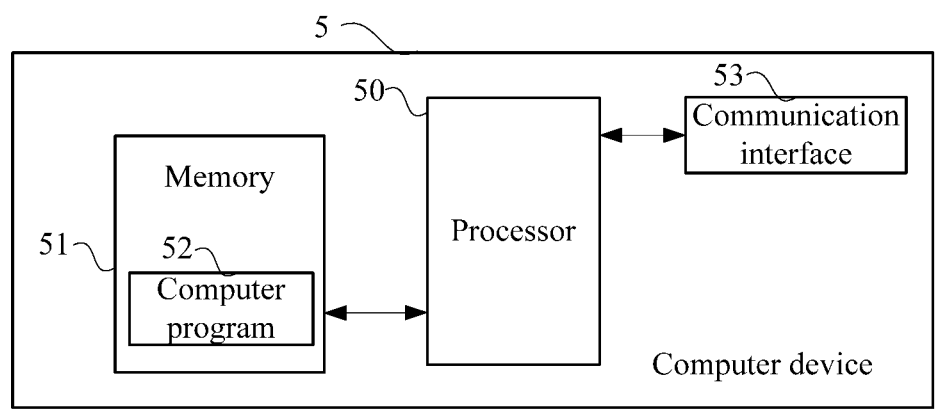

FIG. 3 a flow chart of specific implementation of a method of determining a shared service index based on a shared service of a communication credential according to embodiment three of the present disclosure;

FIG. 4 illustrates a schematic diagram of application scenario of a method of determining a shared service index based on a shared service of a communication credential according to embodiment four of the present disclosure; and FIG. 5 illustrates a schematic structural diagram of a computer device provided by one embodiment of the present disclosure.

DETAILED DESCRIPTION OF EMBODIMENTS
OF THE INVENTION

In the following description, in order to describe but not intended to limit the present disclosure, concrete details such as specific system structure, technique, and the like are proposed, so that a comprehensive understanding of the embodiments of the present disclosure is facilitated. However, it will be apparent to one of ordinary skill in the art that, the present disclosure can also be implemented in other ways without these concrete details. In some other conditions, detailed explanations of method, circuit, device and system well known to those skilled in the art are omitted, so that unnecessary details do not encumber a clear understanding of the description of the present disclosure.

It should be understood that, when a term "comprise/include" is used in the description and annexed claims of the present disclosure, the term "comprise/include" indicates existence of the described characteristics, integer, steps, operations, elements and/or components, but does not exclude existence or adding of one or more other characteristics, integer, steps, operations, elements, components and/or combination thereof.

It should also be understood that, terms "and/or" used in the description and the annexed claims of the present disclosure are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Terms of "the first", "the second" and "the third" are only for distinguishing in description, and should not be interpreted as indicating or implying relative importance.

The descriptions of "referring to one embodiment" and "referring to some embodiments", and the like as described in the specification of the present disclosure means that a specific feature, structure, or characters which are described with reference to this embodiment are included in one embodiment or some embodiments of the present disclosure. Thus, the sentences of "in one embodiment", "in some embodiments", "in some other embodiments", "in other embodiments", and the like in this specification are not necessarily referring to the same embodiment, but indicate "one or more embodiments instead of all embodiments", unless there is a special emphasis in other manner otherwise. The terms "comprising", "including", "having" and their variations mean "including but is not limited to", unless there is a special emphasis in other manner otherwise.

In the embodiments of the present disclosure, the operating parameters of the communication credentials for providing shared communication services in the shared service period are acquired, then, the shared service index is determined according to the acquired operating parameters, so that the qualities of the shared services of the communication credentials are quantified, the recommendation information is generated according to the shared service indexes, the recommendation information intuitively represents the differences of the qualities of the shared services provided by the communication credentials, when the user terminal sends an instruction for requesting the shared service, more reference options are provided for the user when he/she selects the shared services of the communication credentials, so that the user is avoided from selecting a communication credential with lower quality of shared service when he/she can not determine the qualities of the shared services of the communication credentials. In the embodiments of the present disclosure, the executive subject of the process is a server which includes but is not limited to a publishing and selling platform provided for the terminal device of the communication credential, a selecting and purchasing platform provided for the request terminal of shared service. In particular, the server also has the capability of providing communication credentials for shared services.

Figure 1:
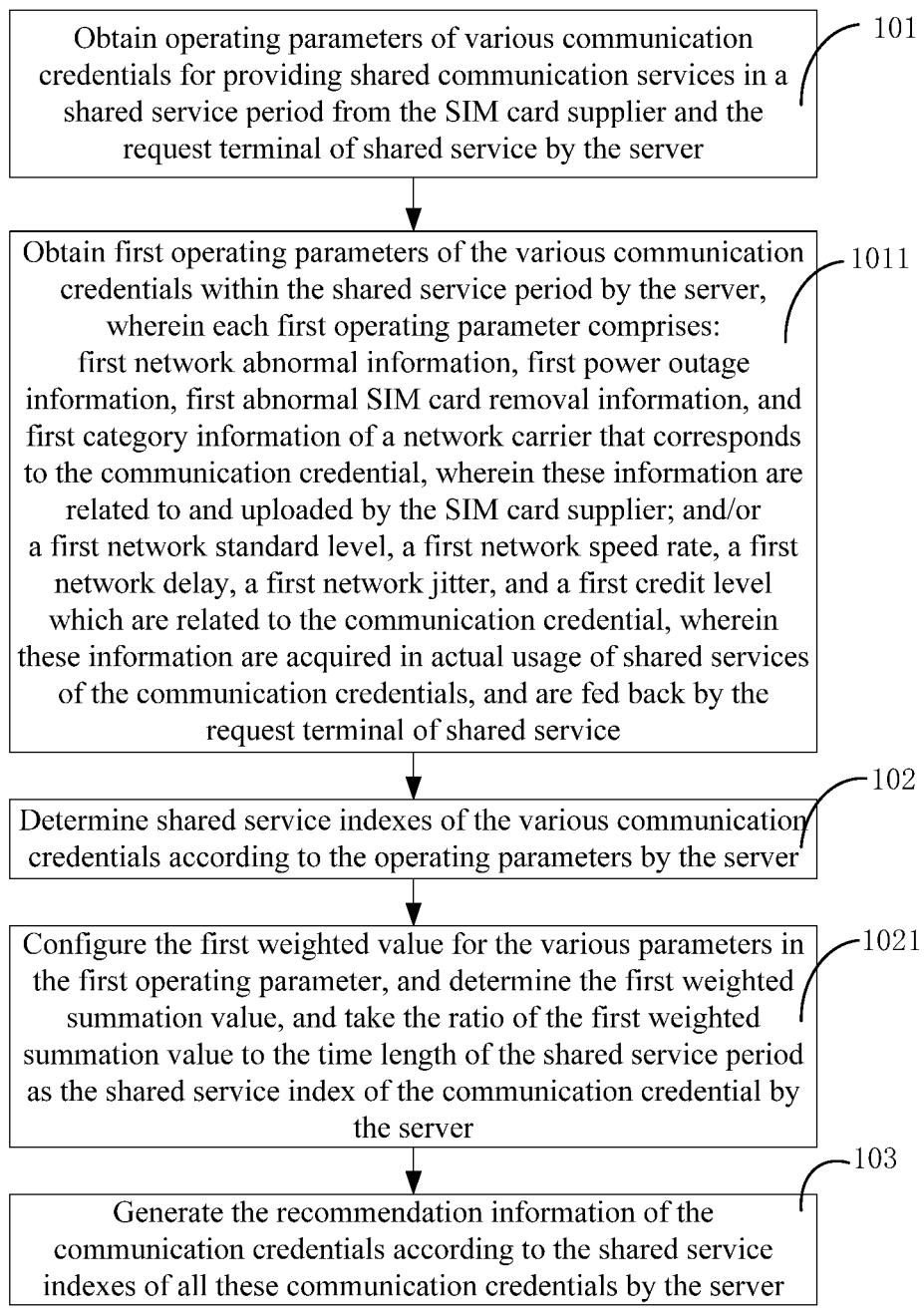
FIG. 1 illustrates a flow chart of specific implementation of a method of determining a shared service index based on a shared service of a communication credential according to embodiment one of the present disclosure.

FIG. 1 illustrates a flow chart of implementation of a method for determining a shared service index based on shared service of communication credential according to embodiment one of the present disclosure. This method is performed on a system for shared service of communication credential comprising a SIM card supplier, a request terminal of shared service and a server communicated with the SIM card supplier and the request terminal of shared service. By way of example but not limitation, the application scenario of the method for determining the shared service index based on the shared service of communication credential includes at least one communication credential used for providing shared communication service.

In a step of S101, an operational parameter of each communication credential is obtained by the server for providing shared communication service within a shared service period from the SIM card supplier and the request terminal of shared service.

In this embodiment, the communication credential may be a SIM (Subscriber Identification Module) card, the shared service of the communication credential may be an authority of providing the communication credential for the SIM card supplier, the request terminal (i.e., the user terminal) for shared service may share the communication authority provided by the communication credential in the shared service period, and communicate with another terminal device based on the communication authority. The shared service period is the time duration for shared service which is speculated in a communication credential shared service contract reached by a SIM card supplier and users.

In this embodiment, the server obtains operating parameters of a SIM card in the shared service contract from the SIM card supplier and the user terminal, after the SIM card supplier and the users reach the SIM card shared service contract.

In this embodiment, the shared communication service may refer to SIM card resources (e.g., mobile data traffic, call duration, communication tariff) that needs to be called by the user. The user may send a request of using shared service to the server through a user terminal which has established a shared protocol. The request contains the SIM card resource parameters that needs to be called. The server forwards the request to the SIM card supplier, and the SIM card supplier consumes the SIM card resource that matches the SIM card resource parameter after receiving the request, that is, the SIM card supplier requests service from a network carrier corresponding to the SIM card, after obtaining the data sent from the network carrier, the SIM card supplier forwards the data to server, the server forwards the data to the user terminal, the effect that the user acquires communication service from a network carrier of a SIM card by sharing SIM sources of the SIM card on another device is realized, and services provided by the same SIM card are shared by the user terminal and the SIM card supplier is realized.

Furthermore, as another embodiment of the present disclosure, the step S101 may include:

In a step of S1011, obtaining, by the server, a first operational parameter of each communication credential in the shared service period, wherein the first operating parameter includes: the first network abnormal information, the first power outage information, the first abnormal SIM card removal information, and the first category information of a network carrier that corresponds to the communication credential, wherein these information are related to a SIM card supplier and are uploaded by the SIM card supplier; and/or the first network standard, the first network speed rate, the first network delay, the first network jitter, and the first credit level, wherein these information are related to the communication credential and are fed back by the request terminal of shared service.

In this embodiment, more specifically, the step S1011 may be understood as follows: after the SIM card supplier has reached a SIM card shared service contract with the user, the server obtains information of the SIM card supplier in the contract from the SIM card supplier according to the preset acquisition period, this information includes the first network abnormal information, the first power outage information, the first abnormal SIM card removal information, the first abnormal power outage information, and the category of the network carrier that corresponds to the SIM card; and the server obtains information from the user terminal in the acquisition period, this information includes the network standard level, the network speed rate, the network delay, the network jitter, and the credit level obtained when the shared service provided by the SIM card is actually used in the contract.

The network abnormal information of the SIM card supplier includes the number of network disconnections, the time duration of the network disconnection and the network delay of the SIM card supplier. The power outage information of the SIM card supplier includes the number of times of power outage and the time duration of power outage of the SIM card supplier, the abnormal SIM card removal information of the SIM card supplier includes: the number of abnormal SIM card removals and the time duration of abnormal removal of SIM card.

In this embodiment, the category information of the network carrier that corresponds to the SIM card includes but is not limited to China Unicom, China Mobile, and China Telecommunications; the network standard level of the SIM card includes but is not limited to 2G (The Second Generation Mobile Communication Technology), 3G (The Third Generation Mobile Communication Technology), 4G (The Fourth Generation Mobile Communication Technology), and 5G (The Fifth Generation Mobile Communication Technology); the credit level of the shared service contract is a ratio of time duration that the user spends on actually using the SIM card shared service during the shared service contract to a time duration of the SIM card shared service that the SIM card supplier should provide, which is specified in the contract.

In this embodiment of the present disclosure, various parameters in the first operating parameter are obtained, since the parameters have covered the operating parameters of the SIM card supplier and the SIM card in different aspects in communication process, the shared service index is determined according to the operating parameters in a subsequent step, so that the accuracy of the shared service index is improved.

In a step of S102, shared service indexes of the communication credentials are determined by the server, respectively.

In this embodiment, the obtained operating parameters are determined according to a preset logical relationship, the shared service index is obtained, wherein the lower the value of the shared service index, the higher the quality of the shared service of the SIM card.

In this embodiment, the shared service index may refer to the impacts of various factors on the quality of the shared service, and the various factors are embodied by the aforesaid operating parameters.

In this embodiment of the present disclosure, the shared service indexes of the communication credentials are determined respectively according to the operating parameters, so that the qualities of the shared services provided by the communication credentials are quantified, the smaller the shared service index is, the better the quality of shared service is.

Furthermore, as another embodiment of the present disclosure, the step S102 may include:

In a step of S1021, configuring a first weight for each parameter in the first operating parameter and obtaining the shared service index of the communication credential by the server according to the first operating parameter, the first weight, and the time duration of the shared service period.

In this embodiment, in particular, the step S1021 may be understood as: configuring a preset first weight for each parameter obtained according to the network standard level, the network speed rate, the network delay, the network jitter and the credit level, the network standard level, the network speed rate, the network delay, the network jitter and the credit level which are obtained according to the network abnormal information, the power outage information, the abnormal SIM card removal information, the category of the network carrier that corresponds to the SIM card, and actual use of the shared service provided by the SIM card. The shared service index corresponding to the SIM card is obtained according to the first operating parameter and the time duration of the SIM card shared service that the SIM card supplier should provide, which is speculated in the contract.

For example, in a SIM card shared service contract, A is set as the number of times of network disconnection of the SIM card supplier, B is set as the time duration of network disconnection of the SIM card supplier, C is set as network delay level of the SIM card supplier, D is set as the number of times of power outage of the SIM card supplier, E is set as the time duration of power outage of the SIM card supplier, F is set as the number of times of abnormal removal of the SIM card, G is set as time duration of abnormal removal of the SIM card, H is set as the class of the category of the network carrier that corresponds to the SIM card, I is set as the index of SIM card network standard, J is set as network speed level of the SIM card in actual use, K is set as network delay level of the SIM card in actual use, L is set as network jitter level in actual use, X is set as the time duration that the user spent on actually using the SIM card shared service in the shared service contract, and Z is set as the time duration of the SIM card shared service provided by the SIM card supplier and speculated in the shared service contract.

C is determined according to the network delay of the SIM card supplier; H is evaluation record of each network carrier, the higher the evaluation level of the evaluation parameters of each network carrier calculated based on the evaluation levels recorded in each evaluation record, the smaller the H is; I is determined according to the network standard level in actual use of the SIM card, the higher the network standard level, the smaller the I; J is determined according to the network speed in actual use of the SIM card; K is determined according to the network delay in actual use of the SIM card; and L is determined according to the network jitter in actual use of the the SIM card.

Preferably, normalization process is performed on A, B, C, D, E, F, G, H, I, J, K, L, X, Z to obtain A', B', C', D', E', F', G', H', I', J', K', L', X', Z', wherein, the normalization process refers to zooming out data according to an appropriate ratio and removing a dimension of the data such that the data is converted into a scalar quantity and is fallen into a small specific interval. Alternatively, A is the number of times of network disconnection of the SIM card supplier, 30 times of network disconnections is set as 1, and A is zoomed according to a ratio of 30:1; the specific interval may be between 0 and 1. The purpose of performing normalization process on data is to make incomparable data to be comparable.

For example, the shared service index may be determined according to a formula listed as follows:

$$Y = (A' * P_a + B' * P_b + D' * P_d + E' * P_e + F' * P_f + G' * P_g)/Z' + \\ C' * P_c + H' * P_h + I' * P_i + J' * P_j + K' * P_k + L' * P_l + \left(\frac{Z' - X'}{Z'}\right) * P_x$$

Wherein, Y represents a shared service index; the first weight is determined according to an interference level of each parameter on the quality of the shared service, optionally, the interference level may range from 1 to 10, for example, A' is a normalized value of the number of network disconnection of the SIM card supplier, the level of interference of the network disconnection on the shared service is set as 8, the corresponding first weight PA is 0.8;

$$\frac{Z' - X'}{Z'}$$

represents a fulfillment level of the shared service contract which has not been accomplished, when X is equal to Z, it indicates that the shared service contract has been accomplished.

In this embodiment, when the shared service index is determined, the accuracy of determination of the shared service index can be improved according to the various parameters in the first operating parameter and the formula described above.

In a step of S103, generating, by the server, the recommendation information of each communication credential according to the shared service indexes of all communication credentials is generated.

In this embodiment, the recommendation information of the SIM card is generated according to the shared service indexes of all SIM cards. In particular, by way of example but not limitation, when the shared service indexes of at least one SIM card is obtained, a recommendation list that stores all SIM cards is generated, and when a shared service index of a new added SIM card or a shared service index of an existing SIM card is updated, the recommendation list is updated according to the latest shared service indexes of all SIM cards. The aforesaid recommendation list has related information of the SIM card which includes the name of the SIM card supplier, the label information of SIM card labeled by the SIM card supplier, and the shared service index of the SIM card. The SIM cards in the recommendation list are listed in an ascending order according to the shared service index. This is because the lower the shared service index, the higher the quality of the shared service of the SIM card. Thus, the quality of the shared service provided by a SIM card which is listed at the top of the recommendation list is higher than the quality of the shared service provided by other SIM card which is listed at the bottom of the recommendation list.

Figure 2:
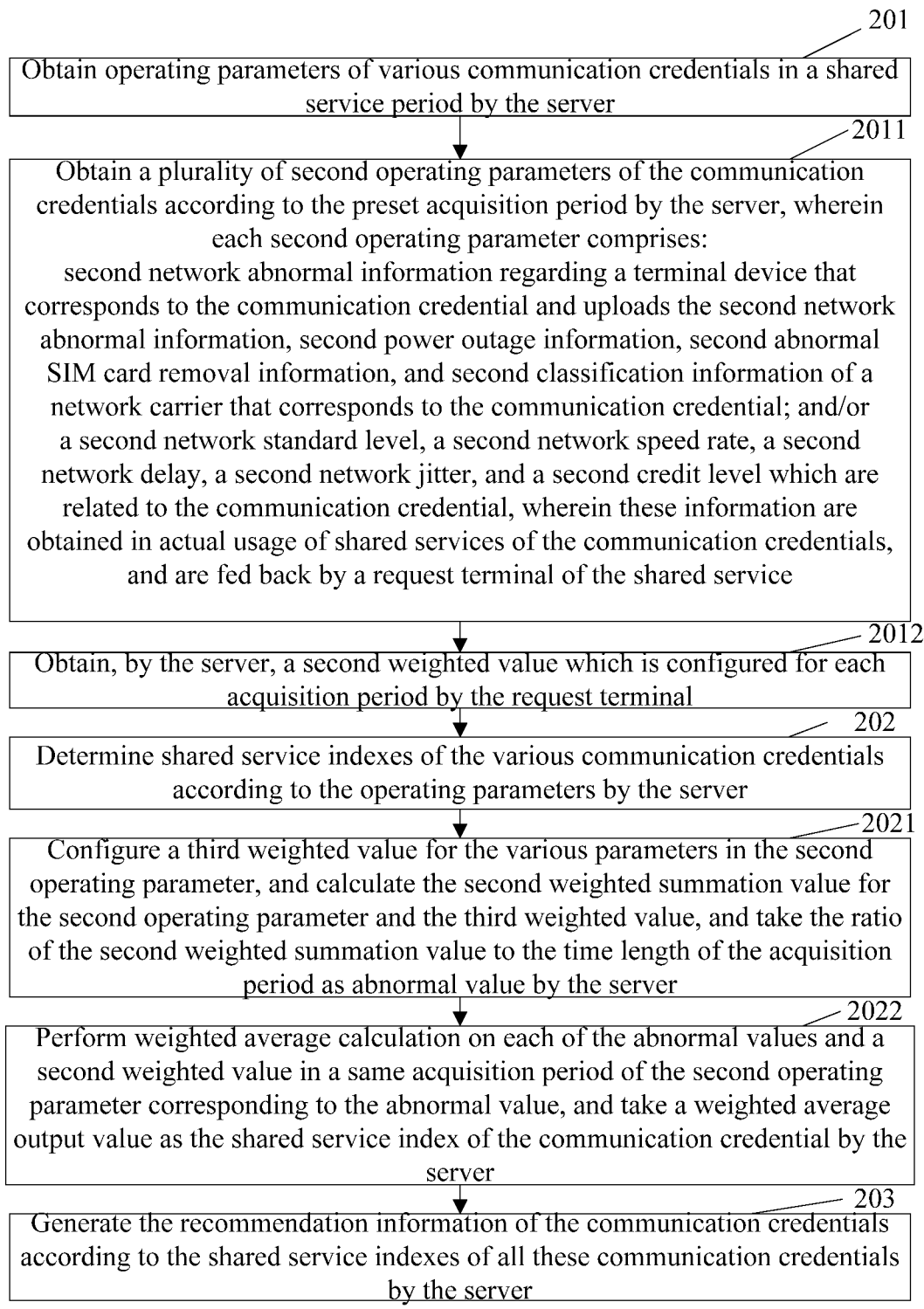
FIG. 2 illustrates a flow chart of specific implementation of a method of determining a shared service index based on a shared service of a communication credential according to embodiment two of the present disclosure.

FIG. 2 illustrates a flowchart of an implementation of a method for determining a shared service index based on a shared service of communication credential according to embodiment two of the present disclosure. By way of example but not limitation, the application scenario of the method for determining shared service index based on the shared service of communication credential includes at least one communication credential for providing shared communication service.

In a step of S201, operational parameters of communication credentials are obtained by the server for providing the shared communication service in a shared service period.

The detail of the implementation process is the same as step S101 in embodiment one of the present disclosure, regarding the detail of the implementation process of step S201, reference can be made to the related description of the aforesaid step S101, the detail of the implementation process of step S201 will not be repeatedly described here.

Furthermore, as another embodiment of the present disclosure, the step S201 may include a step S2011:

obtaining, by the server, a plurality of second operating parameters of the communication credentials according to a preset acquisition period, wherein the second operating parameter includes: the second network abnormal information, the second power outage information, the second abnormal SIM card removal information, and the second category information of a network carrier corresponding to the communication credential, wherein these information are related to and uploaded by the SIM card supplier; and/or the second network standard, the second network speed rate, the second network delay, the second network jitter, and the second credit level, wherein these information are related to the communication credential and are fed back by the request terminal of shared service.

In this embodiment, more specifically, the step S2011 may be understood as follows: after the SIM card supplier has reached a SIM card shared service contract with the user, the server obtains information of the SIM card supplier in the contract from the SIM card supplier according to a preset acquisition period, wherein this information includes the first network abnormal information, the first power outage information, the first abnormal SIM card removal information, the first abnormal power outage information, and the category of the network carrier corresponding to the SIM card; and the server obtains information from the user terminal in the acquisition period, wherein this information includes the network standard level, the network speed rate, the network delay, the network jitter, and the credit level obtained when the shared service provided by the SIM card is actually used.

The preset acquisition period may be determined by dividing the time duration of the SIM card shared service provided by the SIM card supplier and specified in the shared service contract by N. For example, if the time duration of the SIM card shared service provided by the SIM card supplier and specified in the shared service is 30 days, then, N is 30, for another example, if the time duration of the SIM card shared service provided by the SIM card supplier and specified in the shared service is 1 day, that is, 24 hours, N is 24; Wherein, the network abnormal information of the SIM card supplier includes the number of network disconnection, the time duration of the network disconnection and the network delay of the SIM card supplier. The power outage information of the SIM card supplier includes the number of times of power outage and the time duration of power outage of the SIM card supplier, the abnormal SIM card removal information of the SIM card supplier includes: the number of abnormal removals of SIM card and the time duration of the abnormal removal of SIM card.

In this embodiment, the category of the network carrier that corresponds to the SIM card includes but is not limited to China Unicom, China Mobile, and China Telecommunications; the network standard level of the SIM card includes but is not limited to 2G (The Second Generation Mobile Communication Technology), 3G (The Third Generation Mobile Communication Technology), 4G (The Fourth Generation Mobile Communication Technology), and 5G (The Fifth Generation Mobile Communication Technology); the credit level of the shared service contract is a ratio of time duration that the user spends on actually using the SIM card shared service during the shared service contract and time duration of the SIM card shared service that the SIM card supplier should provide, which is specified in the contract.

In this embodiment of the present disclosure, various parameters in the second operating parameter are obtained, so that the accuracy of determination of the shared service index is improved in a subsequent step.

Furthermore, as another embodiment of the present disclosure, the step S201 may also include a step S2012:

obtaining, by the server, a second weight of each acquisition period. The second weight is configured by the requesting terminal of shared service.

In this embodiment, in particular, a second weight of each acquisition period, which is configured by the user, is obtained. By way of example but not limitation, for example, the time duration of the SIM card shared service that the SIM card supplier should provide and specified in the SIM card shared service contract is 30 days, and the acquisition period is 1 day. The server acquires a second weight configured by the user each day, the second weight is determined according to the user's demand level on the shared service provided by the SIM card in this day, the demand level may be divided to range from 1 to 10, optionally, when the demand level is 10, the second weight is 1, when the demand level is 5, the second weight is 0.5. By considering the user's demand level of the shared service provided by the SIM card in this day, the user's demand level of the shared service provided by the SIM card in this day may be set as one of the parameters for determining the shared service index, the second weight configured by the user is introduced into the shared service index, so that the accuracy of the shared service index is improved.

In the step of S202, a shared service index of each communication credential is determined by the server, respectively, according to the operating parameter.

The detail of the implementation process of step S202 is the same as the step S102 in embodiment one of the present disclosure, regarding the detailed implementation process of step S202, reference can be made to the relevant description of the aforesaid step S102, the detailed implementation process of step S202 will not be repeatedly described here.

Furthermore, as another embodiment of the present disclosure, the step S202 may include: in a step of S2021, configuring, by the server, a third weight for the parameters in the second operating parameter, and obtaining an abnormal value according to the second operating parameter, the third weight value, and the value of time duration of the acquisition period.

In this embodiment, more specifically, in each acquisition period, the preset third weight value is configured for the parameters including the network information, the power outage information, the abnormal SIM card removal information of the SIM card supplier, the category of the network carrier that corresponds to the SIM card, and network standard level, network speed rate, network delay, network jitter and credit level which are obtained in actual usage of the shared service provided by the SIM card, the abnormal value of the acquisition period is obtained according to the second operating parameter, the third weight value and the time duration of the preset acquisition period, wherein the abnormal value may be understood as the degree of influence of various abnormal factors on the shared service in unit time within the acquisition period, and the third weight corresponding to each parameter in each acquisition period is the same as the first weight value corresponding to the same parameter in embodiment one.

For example, in an acquisition period, A is set as the number of times of network disconnection of the SIM card supplier, B is set as the time duration of network disconnection of the SIM card supplier, C is set as network delay level of the SIM card supplier, D is set as the number of times of power outage of the SIM card supplier, E is set as the time duration of power outage of the SIM card supplier, F is set as the number of times of abnormal removal of the SIM card, G is set as time duration of abnormal removal of the SIM card, H is set as the class of the category of the network carrier that corresponds to the SIM card, I is set as the index of SIM card network standard, J is set as network speed level of the SIM card in actual use, K is set as network delay level of the SIM card in actual use, L is set as network jitter level in actual use, X is set as the time duration that the user spent on actually using the SIM card shared service in the shared service contract, and Z is set as the time duration of the SIM card shared service provided by the SIM card supplier and speculated in the shared service contract.

C is determined according to the network delay of the SIM card supplier; H is evaluation record of each network carrier, the higher the evaluation level of the evaluation parameters of each network carrier calculated based on the evaluation levels recorded in each evaluation record, the smaller the H is; I is determined according to the network standard level in actual use of the SIM card, the higher the network standard level, the smaller the I; J is determined according to the network speed in actual use of the SIM card; K is determined according to the network delay in actual use of the SIM card; and L is determined according to the network jitter in actual use of the the SIM card.

Preferably, normalization process is performed on the parameters of A, B, C, D, E, F, G, H, I, J, K, L, X, Z to obtain A', B', C', D', E', F', G', H', I', J', K', L', X', Z', wherein, said normalization process refers to zooming out data according to an appropriate ratio and removing a dimension of the data such that the data is converted into a scalar quantity and is fallen into a small specific interval. Alternatively, A is the number of times of network disconnections of the SIM card supplier, 30 times of network disconnections is set as 1, and A is zoomed according to a ratio of 30:1; the specific interval may be between 0 and 1. The purpose of performing normalization process on data is to make incomparable data to be comparable.

For example, the shared service index may be determined according to a formula as follows:

$$Y = (A'*P_a + B'*P_b + D'*P_d + E'*P_e + F'*P_f + G'*P_g)/Z' + $$
$$C'*P_c + H'*P_h + I'*P_i + J'*P_j + K'*P_k + L'*P_l + \left(\frac{Z'-X'}{Z'}\right)*P_x$$

Y represents a shared service index; $P_a$, $P_b$, $P_c$, $P_d$, $P_e$, $P_f$, $P_g$, $P_h$, $P_i$, $P_j$, $P_k$, $P_l$, $P_x$ are the corresponding third weight values respectively, and the third weight values are determined according to an interference level of each parameter on the quality of the shared service, optionally, the interference level may range from 1 to 10, for example, A' is a normalized value of the number of network disconnection of the SIM card supplier, the level of interference of the network disconnection on the shared service is set as 8, the corresponding first weight $P_a$ is 0.8;

$$\frac{Z'-X'}{Z'}$$

represents a fulfillment level of the shared service contract which has not been accomplished, when X is equal to Z, it indicates that the shared service contract has been accomplished.

In this embodiment, when the shared service index is determined, the accuracy of determination of the shared service index can be improved according to the various parameters in the first operating parameter and the aforesaid formula.

In a step of S2022, a weighted average process on each of the abnormal values is performed by the server with the second weighted value being in the same acquisition period of the second operating parameter corresponding to the abnormal value. The output value is taken after weighted average processing as the shared service index of the communication credential.

In this embodiment, more specifically, since the abnormal value is obtained by converting based on a corresponding second operational parameter in each acquisition period, that is, each abnormal value corresponds to one unique acquisition period, and each second weighted value has a corresponding acquisition period, either, thus, a correspondence relationship between the abnormal values and the second weighted values may be established according to the sequences of the acquisition periods, and the weighted average process may be respectively performed on the obtained various abnormal values and the second weighted values which are within the same acquisition period of the second operating parameters corresponding to the abnormal values based on the correspondence relationship, respectively, and the output value after weighted average process is used as the shared service index of the SIM card.

For example, the shared service index of the SIM card may be determined according to the formula as follows:

$$Y_i(Y_{h1}*P_1 + Y_{h2}*P_2 + \ldots + Y_{hn}P_n)/N$$

Wherein, $Y_{h1}$ to $Y_{hn}$ are the abnormal values respectively corresponding to the acquisition periods during the SIM card shared service contract; N is the ratio of the time duration that the SIM card supplier should provide in the SIM card shared service to the preset acquisition period; $P_1$ to $P_n$ are the corresponding second weighted values, respectively.

In this embodiment, when determining the shared service index, the value of the shared service index is determined according to the various parameters in the second operating parameter and the formula listed above. Since the aforesaid parameters cover the second operating parameters of the SIM card supplier and the SIM card itself in different aspects during the communication, the second weighted value is specially introduced, so that the accuracy of the shared service index is further improved.

In a step of S203, the recommendation information of the communication credentials is generated by the server according to the shared service indexes of all these communication credentials.

The detailed implementation process of the step S203 is the same as the step S103 in embodiment one of the present disclosure, regarding the description of the detailed implementation process of the step S203, reference can be made to the related description of step S103, the detailed implementation process of the step S203 is not repeatedly described here.

It should be understood that, the values of serial numbers of the steps and alphabets in the aforesaid embodiments do not mean a sequencing of execution sequences of the steps, the execution sequence of each of the steps should be determined by functionalities and internal logic of the steps, and shouldn't be regarded as limitation to an implementation process of the embodiment of the present disclosure.

FIG. 3 illustrates a flow diagram of implementation of a method for determining shared service indexes based on shared services provided by communication credentials according to embodiment three of the present disclosure. Referring to FIG. 3, the method for determining shared service indexes based on shared services of the communication credentials according to this embodiment of the present disclosure further includes a step S301 and a step S302 after the step S103, which are described in detail as follows:

In the step of S301, sending, when acquiring a request instruction sent by a request terminal of a shared service, the recommendation information to the request terminal of shared service by the server.

In the step of S302, the communication credential corresponding to the shared service index is taken by the server with the lowest value as a target scheduling credential for the request terminal of shared service when receiving a scheduling instruction sent by the request terminal of shared service, thereby providing a shared communication service for the request terminal of shared service through the target scheduling credential by the server.

In this embodiment, when obtaining a request of purchasing shared service sent by a user terminal, the recommendation information is sent to the user terminal. In particular, by way of example but not limitation, the recommendation information is the recommendation list as described in step S103, when the request for purchasing shared service sent by the user terminal is obtained, the recommendation list is sent to the user terminal, so that users can intuitively view the information related to the plurality of SIM cards, more specifically, the users are allowed to get to know the differences of the qualities of the shared services of the SIM cards.

In this embodiment, when the scheduling instruction of the user terminal is obtained, the SIM card with the highest quality of shared service is enabled to provide the user with the shared service. In particular, by way of example but not limitation, a SIM card which is listed at the top of the aforementioned recommendation list is searched, and this SIM card is taken as the target scheduling SIM card which is enabled to provide shared service for a user.

It should be understood that, the values of serial numbers of the steps and alphabets in the aforesaid embodiments do not mean a sequencing of execution sequences of the steps, the execution sequence of each of the steps should be determined by functionalities and internal logic of the steps, and shouldn't be regarded as limitation to an implementation process of the embodiment of the present disclosure.

In accordance with the method for determining shared service index based on shared service of communication credential according to the embodiments described above, FIG. 4 illustrates an application scenario of the method for determining shared service index based on shared service of communication credential according to one embodiment of the present disclosure, that is, a system for shared service of communication credential, which is described in detail below:

In this embodiment, by way of example but not limitation, SIM card supplying box of user A and/or mobile phone of SIM card supplier and/or the server in FIG. 4 are the SIM card suppliers for the shared communication service, and a mobile phone of a user B is the request terminal of shared service. Specifically, the user A supplies SIM card to the server, the server also has the capability to supply SIM card, and the user B obtains shared service of the SIM card from the server remotely.

Specifically, the user A may use a SIM card shared device to connect with the server and earn revenues or equivalent tokens by publishing and selling his/her SIM card resources or share Modem device through the server.

The user B uses the mobile phone or any device having virtual SIM card function to connect with the server through an App or world wide web, after identity authentication is passed, the user can select, purchase and enjoy the shared service of the SIM card using remote SIM card resources. The user B can also use the App or web without modem device to connect with the server to enjoy shared service from the SIM card, at this time, the SIM card purchased by the user is standby on the modem pool of the server or the modem pool shared by the user A, when the user terminal requests the shared service provided by the SIM card, this SIM card transmits various data required by the user to the App of the user terminal or the web through the Internet, the data includes but is not limited to voice data and short message data.

The server provides connection, management device, and user account, verifies the validity of the published SIM card, establishes SIM card sharing relationship for the user A and the user B, calculates the earnings of the user A, and scores shared service of SIM card provided by the user A; when the SIM card resources provided by SIM card of the user A are insufficient, SIM card may also be provided by the server; when the user B does not have a modem device, a cloud service provides the modem pool or use the modem shared by the user A to enable the SIM card purchased by the user B to standby remotely, so that the shared service of the SIM card is enjoyed through the Internet; alternatively, a shared service of a SIM card and the pricing of the shared service of the SIM card are provided for a designated user according to the requirement of the user A.

In this embodiment, by way of example but not limitation, the aforesaid sharing device may be arranged in any device or cell phone, or is existed alone; the sharing device may be connected with the server in a wired or wireless manner; the SIM card resource may be mobile data traffic, time duration of call and tariff of short message; the aforesaid token and the currency may be exchanged in floating manner; the remote SIM card includes a SIM card provided by the user A and a SIM card provided by the server itself; and the server scores the SIM card shared service provided by the user A, which is implemented according to the method for determining shared service index based on shared service of communication credential in the embodiment one and/or the embodiment two and/or the embodiment three of the present disclosure.

It should be understood that, the values of serial numbers of the steps and alphabets in the aforesaid embodiments do not mean a sequencing of execution sequences of the steps, the execution sequence of each of the steps should be determined by functionalities and internal logic of the steps, and shouldn't be regarded as limitation to an implementation process of the embodiment of the present disclosure.

In accordance with the method for determining shared service index based on shared service of communication credential according to the embodiments described above, FIG. 4 illustrates a structural block diagram of a device for determining shared service index based on shared service of communication credential according to one embodiment of the present disclosure, for the convenience of description, the part associated with this embodiment of the present disclosure is merely illustrated.

It needs to be noted that, since the contents including information interaction and execution process between the aforesaid devices/units and the method embodiments of the present disclosure are based on the same concept, regarding the specific functionalities and the technical effects generated due to the functionalities, reference can be made to the method embodiments, the contents will not be repeatedly described here.

The person of ordinary skill in the art may understand clearly that, for the convenience of description and conciseness, the dividing of the aforesaid various functional units and functional modules is merely described according to examples, in an actual application, the aforesaid functions may be assigned to different functional units and functional modules to be accomplished, that is, an inner structure of the device is divided into different functional units or modules, so that the whole or a part of functionalities described above can be accomplished. The various functional units and modules in the embodiments may be integrated into a processing unit, or each of the units exists independently and physically, or two or more than two of the units are integrated into a single unit. The aforesaid integrated unit may either by actualized in the form of hardware or in the form of software functional units. In addition, specific names of the various functional units and modules are only used to distinguish from each other conveniently, rather than being intended to limit the protection scope of the present disclosure. Regarding the specific working process of the units and modules in the aforesaid system, reference may be made to a corresponding process in the aforesaid method embodiments, this specific working process is not repeatedly described herein.

FIG. 5 illustrates a schematic structural diagram of a computer device 5 according to one embodiment of the present disclosure. As shown in FIG. 5, the computer device 5 in this embodiment includes: at lest one processor 50 (only one processor is shown in FIG. 5), a memory 51, a computer program 52 stored in the memory 51 and executable by the processor 50, and a communication interface 53, wherein the processor 50, when executing the computer program 52, is configured to implement the steps in any one of method embodiments for determining shared service index based on shared services of communication credentials. Wherein the communication interface 53 can be either a wired network interface or a wireless network interface.

The computer device 5 may be such as a desk top computer, a laptop computer, a palm computer or a cloud server, the computer device 5 may include but is not limited to the processor 50 and the memory 51. The person of ordinary skill in the art may be aware of the fact that, FIG. 5 is merely an example of the computer device 5 and is not constituted as limitation to the computer device 5, more or less components than the components shown in FIG. 5 may be included, or some components or different components may be combined; for example, the computer device 5 may also include an input and output device, a network access device, etc.

The so called processor 50 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor can also be any conventional processor and the like.

The memory 51 may be an internal storage unit of the computer device 5, such as a hard disk or a memory of the computer device 5. The memory 51 may also be an external storage device of the computer device 5, such as a plug-in hard disk, a SMC (Smart Media Card), a SD (Secure Digital) card, a FC (Flash Card) equipped on the computer device 5. Furthermore, the memory 51 may not only include the internal storage unit of the computer device 5, but also include the external storage device of the computer device 5. The memory 51 is configured to store the operating system, application programs, BootLoader, data, and other procedures, such as program codes of computer programs. The memory 51 may also be configured to store data that has been output or being ready to be output temporarily.

The embodiments of the present disclosure further provides a computer program product, when the computer program product is operated on a mobile terminal, the mobile terminal is caused to implement the steps in the various method embodiments described above when executing the computer program product.

When the integrated unit is achieved in the form of software functional units, and is sold or used as an independent product, the integrated unit may be stored in a computer readable storage medium. Based on this understanding, a whole or part of flow process for implementing the method in the embodiments of the present disclosure can also be accomplished in the manner of using computer program to instruct relevant hardware. When the computer program is executed by the processor, the steps in the various method embodiments described above may be implemented. Wherein, the computer program comprises computer program codes, which may be in the form of source code, object code, executable documents or some intermediate form, etc.

In the aforesaid embodiments, the emphases of the embodiments are described respectively, regarding the part of an embodiment which is not described or disclosed in detail, reference can be made to relevant descriptions in some other embodiments.

The person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

In some embodiments provided by the present disclosure, it should be understood that the device and the method disclosed may be achieved in other ways. For example, the aforementioned device embodiments are schematic merely, for example, the division of the aforementioned units is just a kind of logic function division, some other divisions may be used in actual implementations, for example, a plurality of units or components may be combined or integrated into another system, or some features may be ignored or unexecuted. Another point, the interacted coupling or directly coupling or communication connection displayed or discussed may be indirect coupling or communication connection through some ports, devices or units, and the form of the connection may be electrical connection, mechanical connection, or other types of connection.

The units described as separate components can be or can not be physically separated, the components shown as units can be or can not be physical units, the components may be located in one place, or be distributed onto multiple network elements. A part or a whole of the elements can be selected to achieve the objective of the technical solution of this embodiment according to the actual requirement.

As stated above, the aforesaid embodiments are only intended to illustrate but not to limit the technical solutions of the present disclosure. Although the present disclosure has been explained in detail with reference to the aforesaid embodiments, the skilled person in the art should be aware of the fact that, the technical solutions described in each of the embodiments mentioned above can still be amended, or some technical features in the technical solutions may be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

What is claimed is:

1. A method of determining shared service index based on shared service of communication credential, which is implemented on a system for shared service of communication credential comprising a SIM card supplier, a request terminal of shared service and a server communicated with the SIM card supplier and the request terminal of shared service, wherein the method comprises:

obtaining, by a server, operating parameters of communication credentials for providing shared communication services in a shared service period from the SIM card supplier and the request terminal of shared service;

determining, by the server, shared service indexes of the communication credentials according to the operating parameters; and generating, by the server, recommendation information of the communication credentials according to the shared service indexes of all these communication credentials;

wherein said obtaining, by the server, operating parameters of communication credentials for providing shared communication services in the shared service period from the SIM card supplier and the request terminal of shared service further comprises:

obtaining, by the server, a plurality of second operating parameters of the communication credentials in a preset acquisition period from the SIM card supplier, wherein each second operating parameter comprises:

second network abnormal information, second power outage information, second abnormal SIM card removal information, and second category information of a network carrier that corresponds to the communication credential, wherein these information are related to and uploaded by the SIM card supplier; and/or a second network standard level, a second network speed rate, a second network delay, a second network jitter, and a second credit level which are related to the communication credential, wherein these information are obtained in actual usage of shared services of the communication credentials and are fed back by the request terminal of shared service;

wherein said obtaining, by the server, operating parameters of communication credentials for providing shared communication services in the shared service period from the SIM card supplier and the request terminal of shared service further comprises:

obtaining a second weighted value for each acquisition period, wherein the second weighted value is configured by the request terminal of shared service;

wherein said determining, by the server, shared service indexes of the communication credentials according to the operating parameters comprises:

configuring, by the server, a third weighted value for each parameter in each of the second operating parameters, and determining abnormal values according to each of the second operating parameters, the third weighted value, and a time duration of each acquisition period; and performing, by the server, weighted average calculation on each of the abnormal values and a second weighted value which is in a same acquisition period of the second operating parameter corresponding to the abnormal value, and taking an output value after weighted average process as the shared service index of the communication credential.

2. The method according to claim 1, wherein said obtaining, by the server, operating parameters of communication credentials for providing shared communication services in the shared service period from the SIM card supplier and the request terminal of shared service comprises:

obtaining first operating parameters of the communication credentials in the shared service period, wherein each first operating parameter of each communication credential comprises:

first network abnormal information, first power outage information, first abnormal SIM card removal information, and first category information of a network carrier that corresponds to the communication credential, wherein these information are related to and uploaded by the SIM card supplier; and/or a first network standard level, a first network speed rate, a first network delay, a first network jitter, and a first credit level which are related to the communication credential, wherein these information are acquired in actual usage of shared services of the communication credentials, and are fed back by the request terminal of shared service.

3. The method according to claim 2, wherein said determining, by the server, shared service indexes of the communication credentials according to the operating parameters comprises:

configuring, by the server, a first weighted value for each parameter in the first operating parameter, and determining the shared service index of the communication credential according to the first operating parameter, the first weighted value, and a time duration of the shared service period.

4. The method according to claim 1, further comprising:

sending, by the server, the recommendation information to the request terminal of shared service, when obtaining a shared service request instruction sent by the request terminal of shared service; and/or taking, by the server, a communication credential which has a lowest value and corresponds to the shared service index as a target scheduling credential for the request terminal of shared service when receiving a scheduling instruction sent by the request terminal of shared service, thereby providing the shared communication service for the request terminal of shared service through the target scheduling credential by the server.

5. A computer device, comprising: a memory, a processor, a computer program stored in the memory and executable by the processor and a communication interface, wherein the processor is configured to implement steps of the method of determining shared service index based on shared service of communication credential according to claim 1.

6. A non-transitory computer readable storage medium, wherein the non-transitory computer readable storage medium stores a computer program, when the computer program is executed by a processor of a computer device, the processor is caused to perform steps of:

obtaining operating parameters of communication credentials for providing shared communication services in a shared service period;

determining shared service indexes of the communication credentials according to the operating parameters; and generating recommendation information of the communication credentials according to the shared service indexes of all these communication credentials;

wherein said obtaining operating parameters of communication credentials for providing shared communication services in the shared service period from the SIM card supplier and the request terminal of shared service further comprises:

obtaining a plurality of second operating parameters of the communication credentials in a preset acquisition period from the SIM card supplier, wherein each second operating parameter comprises:

second network abnormal information, second power outage information, second abnormal SIM card removal information, and second category information of a network carrier that corresponds to the communication credential, wherein these information are related to and uploaded by the SIM card supplier; and/or a second network standard level, a second network speed rate, a second network delay, a second network jitter, and a second credit level which are related to the communication credential, wherein these information are obtained in actual usage of shared services of the communication credentials and are fed back by the request terminal of shared service;

wherein said obtaining operating parameters of communication credentials for providing shared communication services in the shared service period from the SIM card supplier and the request terminal of shared service further comprises:

obtaining a second weighted value for each acquisition period, wherein the second weighted value is configured by the request terminal of shared service;

wherein said determining shared service indexes of the communication credentials according to the operating parameters comprises:

configuring a third weighted value for each parameter in each of the second operating parameters, and determining abnormal values according to each of the second operating parameters, the third weighted value, and a time duration of each acquisition period; and performing weighted average calculation on each of the abnormal values and a second weighted value which is in a same acquisition period of the second operating parameter corresponding to the abnormal value, and taking an output value after weighted average process as the shared service index of the communication credential.

* * * * *